(12) United States Patent
Hata

(10) Patent No.: US 9,096,098 B2
(45) Date of Patent: Aug. 4, 2015

(54) PNEUMATIC TIRE

(75) Inventor: Hiroshi Hata, Kanagawa-ken (JP)

(73) Assignee: The Yokohama Rubber Co., LTD. (JP)

( * ) Notice: Subject to any disclaimer, the term of this patent is extended or adjusted under 35 U.S.C. 154(b) by 725 days.

(21) Appl. No.: 12/612,825

(22) Filed: Nov. 5, 2009

(65) Prior Publication Data
US 2010/0108229 A1    May 6, 2010

(30) Foreign Application Priority Data

Nov. 5, 2008 (JP) .................................. 2008-284730

(51) Int. Cl.
*B60C 9/02* (2006.01)

(52) U.S. Cl.
CPC ................ *B60C 9/02* (2013.01); *B60C 9/0207* (2013.04); *B60C 2009/0078* (2013.04)

(58) Field of Classification Search
CPC ..................... B60C 9/0207; B60C 2009/0215; B60C 2009/0276; B60C 2009/0284; B60C 9/02; B60C 9/00; B60C 2009/0078; B60C 2009/0071; B60C 2009/0269; B60C 1/0041; B60C 5/14
USPC .......................... 152/532, 548, 551, 558, 560
IPC .......................................................... B60C 9/02
See application file for complete search history.

(56) References Cited

U.S. PATENT DOCUMENTS

| 4,185,675 A | * | 1/1980 | Greiner et al. ................ 152/549 |
| 5,529,106 A | * | 6/1996 | Yamamoto .................... 152/540 |
| 6,024,816 A | * | 2/2000 | Yamakawa et al. ........... 156/123 |
| 6,135,184 A | * | 10/2000 | Fyfe .............................. 152/550 |
| 6,305,452 B1 | * | 10/2001 | Sato .............................. 152/555 |
| 6,401,780 B1 | * | 6/2002 | Patitsas et al. ................ 152/532 |
| 2004/0200556 A1 | * | 10/2004 | Jardine et al. ................ 152/454 |

FOREIGN PATENT DOCUMENTS

| JP | 10-157408 | 6/1998 |
| JP | 2001-233016 | 8/2001 |
| JP | 2001-347808 | 12/2001 |
| JP | 2007-196746 | 8/2007 |

\* cited by examiner

*Primary Examiner* — Justin Fischer
*Assistant Examiner* — Philip N Schwartz
(74) *Attorney, Agent, or Firm* — Thorpe North & Western

(57) ABSTRACT

A pneumatic tire is provided which includes: a carcass that is formed from at least one layer including a plurality of organic fibrous cords or metallic cords and that has a segmented portion segmented at a tread portion; a belt layer; and a carcass segmented portion reinforcing layer that covers the segmented portion, wherein the carcass segmented portion reinforcing layer is formed from a thermoplastic resin or from a thermoplastic elastomer in which a thermoplastic resin component and an elastomer component are blended.

17 Claims, 1 Drawing Sheet

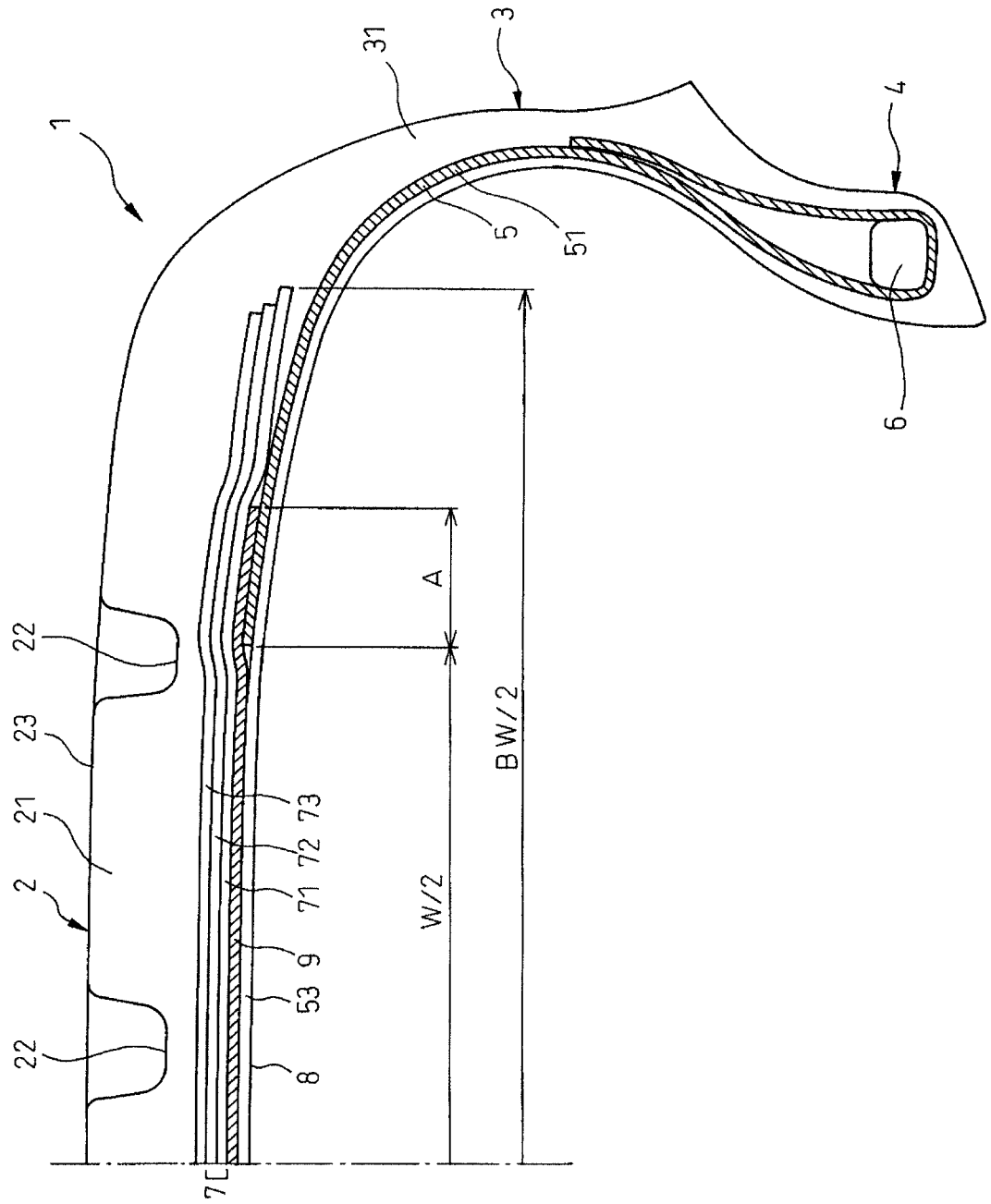

PNEUMATIC TIRE

PRIORITY CLAIM

Priority is claimed to Japan Patent Application Serial No. JP2008-284730 filed on Nov. 5, 2008, which is incorporated herein by reference in its entirety.

TECHNICAL FIELD

The present invention relates to a pneumatic tire, and more specifically relates to a pneumatic tire having a carcass separated at a tread portion.

BACKGROUND ART

Conventional pneumatic tires are normally provided with a carcass formed from at least one layer including a plurality of cords along the inner circumference of the pneumatic tire. In recent years, further weight reduction of pneumatic tires has been desired. Consequently, pneumatic tires having the carcass separated at the tread portion have been suggested (Patent Documents 1 and 2). Such pneumatic tires can reduce the cords used in the carcass only by the part included in the segmented portion segmented at the tread portion. In this way, reduction in weight is thereby possible.

Also, not segmenting the carcass over the whole circumference, but providing an outlined portion wherein the carcass cords are not extended at a plurality of places located at intervals in the circumferential direction of the tread in an area where the carcass is overlapped with a belt has been proposed (Patent Document 3).

Furthermore, covering the carcass segmented portion with a carcass reinforcing layer formed from one layer including metallic cords parallel or almost parallel with at least the metallic cords of the above mentioned carcass has been proposed (Patent Document No. 4).

Patent Document 1: Japanese Unexamined Patent Application Publication No. H10-157408
Patent Document 2: Japanese Unexamined Patent Application Publication No. 2001-347808
Patent Document 3: Japanese Unexamined Patent Application Publication No. 2001-233016
Patent Document 4: Japanese Unexamined Patent Application Publication No. 2007-196746

SUMMARY OF THE INVENTION

Problem to be Solved by the Invention

In the pneumatic tires suggested in Patent Documents 1 and 2, since the carcass is segmented at the tread portion, only rubber is present in this segmented portion. However, in a part of the forming process of pneumatic tires, pressure is added to the tires. When this pressure is added to the pneumatic tires, the pressure is added in a direction from the inner side in the radial direction of the tire to the outer side in the radial direction of the tire. The pneumatic tires are thereby lifted in a direction from the inner side in the radial direction of the tire to the outer side in the radial direction of a tire and expand in the tire width direction. Accordingly, when this formation is performed, since the carcass is not present in the segmented portion, restraining force against expansion in the tire width direction decreases compared to when the carcass is present in this segmented portion. As a result, there is thus the problem that expansion in the tire width direction at the time of forming becomes easier in such pneumatic tires.

With respect to the pneumatic tire proposed in Patent Document 3, although expansion in the tire width direction may be suppressed at the time of forming since the carcass is partially segmented, the weight reduction effect resulting from segmenting the carcass diminishes.

With respect to the pneumatic tire proposed in Patent Document 4, although expansion in the tire width direction may be suppressed since the carcass segmented portion is covered by a carcass reinforcing layer including a plurality of metallic cords, the effect of weight reduction by carcass segmenting diminishes since metallic cords are included in the carcass reinforcing layer.

SUMMARY OF THE INVENTION

The present invention is a pneumatic tire including a carcass that is formed from at least one layer including a plurality of organic fibrous cords or metallic cords and that has a segmented portion segmented at a tread portion; a belt layer; and a carcass segmented portion reinforcing layer that covers the segmented portion, wherein, in the pneumatic tire, the carcass segmented portion reinforcing layer is formed from a thermoplastic resin or from a thermoplastic elastomer in which a thermoplastic resin component and an elastomer component are blended.

Preferably, a storage elastic modulus E' (MPa) of the thermoplastic resin or the thermoplastic elastomer forming the carcass segmented portion reinforcing layer and a thickness t (mm) of the carcass segmented portion reinforcing layer satisfy the relational expressions:

$4t+E'-20 \geq 0$;

$120t+E'-600 \leq 0$;

$E' > 0$;

and $t > 0$.

An overlapping lap width of edges of both the segmented carcass and the carcass segmented portion reinforcing layer in the tire width direction is preferably 7% or more of a maximum width BW in the tire width direction of the belt layer. A segmented width W in the tire width direction of the segmented portion is preferably 10% or more and 95% or less of the maximum width BW in the tire width direction of the belt layer.

Preferably, the pneumatic tire has an inner liner, and the inner liner is formed from a thermoplastic resin or from a thermoplastic elastomer in which a thermoplastic resin component and an elastomer component are blended. The inner liner doubles as the carcass segmented portion reinforcing layer.

Preferably, the pneumatic tire is a passenger vehicle pneumatic tire, the storage elastic modulus E' is 50 to 150 MPa, and the thickness t is 0.01 to 0.3 mm. Preferably, the pneumatic tire is a heavy duty pneumatic tire, the storage elastic modulus E' is 200 to 500 MPa, and the thickness t is 0.01 to 0.2 mm.

BRIEF DESCRIPTION OF THE DRAWINGS

FIG. 1 is a cross section of a pneumatic tire according to the present invention.

EFFECT OF THE INVENTION

In accordance with the present invention, by providing in the carcass segmented portion a carcass segmented portion reinforcing layer which is formed from a thermoplastic resin or from a thermoplastic elastomer in which a thermoplastic resin component and an elastomer component are blended, expansion in the tire width direction at the time of forming can be suppressed while reducing the weight of the tire. That is, in accordance with the present invention, the are no problems when forming the tire, and reduction in weight of the tire is possible.

BEST MODE FOR CARRYING OUT THE INVENTION

The present invention is explained in detail below with reference to the drawing.

FIG. 1, which is a drawing showing a constitutional example of a pneumatic tire according to the present invention, is a cross section of a pneumatic tire 1 cut at the plane including the rotational axis of the tire. Only the right half of the pneumatic tire 1 is shown. As shown in FIG. 1, the pneumatic tire 1 of the present invention is formed by a tread portion 2; and sidewall portions 3 and tire bead portions 4 are on both sides of the tread portion 2. A carcass 5 is provided in each portion. This carcass 5 is wound around a bead core 6 of an opposing tire bead portion 4.

The tread portion 2 is formed of at least an inner liner 8, the carcass 5, a belt layer 7, a carcass segmented portion reinforcing layer 9, and a tread rubber 21. These are laminated in a direction from the inner side in the radial direction of the tire (lower side of FIG. 1) to the outer side in the radial direction of a tire (upper side of FIG. 1) in the order of the inner liner 8, the carcass 5, the carcass segmented portion reinforcing layer 9, the belt layer 7, a belt cover layer 73, and the tread rubber 21. On the outer surface of the tread portion 2 a tread pattern is formed by groove portions 22 and land portions 23 partitioned by the groove portions.

The belt layer 7 is preferably a belt layer that is formed from two or more layers including at least a plurality of belt cords and in which belt cords of adjacent layers intersect. The belt layer 7 is formed from two or more layers including a plurality of belt cords not shown (for example, formed from metal, organic fibers, or the like). In this embodiment, such is formed from two layers 71, 72. Also, the belt layer 7 is laminated on the outer side in the radial direction of a tire more than the carcass segmented portion reinforcing layer 9 so that belt cords (not shown) included in each of the layers 71, 72 intersect with belt cords in the adjacent layer.

The sidewall portion 3 is formed of at least the inner liner 8, the carcass 5, and a sidewall rubber 31. These are laminated in a direction from the inner side in the radial direction of the tire to the outer side in the radial direction of a tire in this order: the inner liner 8, the carcass 5, and the sidewall rubber 31.

The tire bead portion 4 is formed of at least the bead core 6, the carcass 5, and a rubber in which these are embedded. The bead core 6 is formed by bundling a plurality of bead wires (not shown). These bead wires are normally made of metal (for example, steel).

As shown in FIG. 1, the carcass 5 has a segmented portion 53 for segmenting the tread portion 2 into two segment carcasses 51. That is, a portion not including the carcass 5 continues in the tread portion 2 in the circumferential direction of the tire.

Also, the carcass 5 is formed from at least one layer including a plurality of organic fibrous cords or metallic cords. For example, it is formed from one layer of base material and a plurality of metallic cords of steel or the like. Here the carcass 5 is laminated on the outer side in the radial direction of the tire more than the inner liner 8 so that the plurality of organic fibrous cords or metallic cords are at a right angle or almost a right angle to the circumferential direction of the tire (±5° to the radial direction of the tire).

One edge (edge on the outer side in the radial direction of the tire) of the segmented carcass 5 is positioned in the tread portion 2. Also, the other edge (edge on the inner side in the radial direction of the tire) is wound around the bead core 6 and is positioned in the sidewall portion 3 or the tire bead portion 4.

The segmented width W in the tire width direction of the segmented portion 53 is preferably 10% or more and 95% or less of the maximum width BW in the tire width direction of the belt layer 7. That is, $0.1 \leq W/BW \leq 0.9$ is preferable. $0.3 \leq W/BW \leq 0.7$ is more preferable. Although it is possible to reduce the weight by increasing W/BW, expansion in the tire width direction at the time of inflation becomes significant. In other words, this is because tire width significantly increases when adding the same inner pressure to pneumatic tires having a segmented portion 53 in the carcass 5 compared to conventional pneumatic tires of the same size that do not have a segmented portion in the carcass. Conversely, when W/BW decreases, weight reduction is not possible.

The segmented portion 53 is covered by the carcass segmented portion reinforcing layer 9. At the time of tire forming, since the segmented portion 53, in which only unvulcanized rubber is present, is covered by the carcass segmented portion reinforcing layer 9 in the radial direction of the tire, a force for restraining increase in the tire width direction is generated similar to the carcass 5 not having the segmented portion 53. That is, the carcass segmented portion reinforcing layer 9 has the same role as the carcass positioned in the segmented portion 53 of the carcass 5 not having the segmented portion 53. It is thereby possible to suppress expansion in the tire width direction at the time of forming compared to conventional pneumatic tires having only the segmented portion 53.

The carcass segmented portion reinforcing layer 9 is formed from a thermoplastic resin or from a thermoplastic elastomer in which a thermoplastic resin component and an elastomer component are blended.

As the thermoplastic resin forming the carcass segmented portion reinforcing layer 9, polyamide-based resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6 (MXD6), Nylon 6T, Nylon 6/6T copolymer, Nylon 66/PP copolymer, Nylon 66/PPS copolymer, and N-alkoxyalkylates thereof); polyester-based resins (for example, aromatic polyesters such as polybutylene terephthalate (PBT), polyethylene terephthalate (PET), polyethylene isophthalate (PE10), PET/PEI copolymer, polyarylate (PAR), polybutylene naphthalate (PBN), liquid crystal polyester, polyoxyalkylene diimidic acid/polybutylene terephthalate copolymer, and the like); polynitrile-based resins (for example, polyacrylonitrile (PAN), polymethacrylonitrile, acrylonitrile/styrene copolymer (AS), methacrylonitrile/styrene copolymer, methacrylonitrile/styrene/butadiene copolymer); polymethacrylate-based resins (for example, polymethyl methacrylate (PMMA) and polyethyl methacrylate); polyvinyl acetate-based resins (for example, polyvinyl acetate (PVA) and ethylene/vinylacetate copolymer (EVA)); polyvinyl alcohol-based resins (for example, polyvinyl alcohol (PVOH), ethylene vinyl alcohol copolymer (EVOH)); polyvinyl chloride resins (for example, polyvinylidene chloride (PVDC), polyvinyl chloride (PVC), vinyl chloride/vinylidene chloride copolymer, vinylidene chloride/methyl acrylate copolymer, and vinylidene chloride/acrylonitrile copolymer); cellulose-based resins (for example, cellulose acetate and cellulose acetobutyrate); fluorine-based resins (for example, polyvinylidene fluoride (PVDF), polyvinyl fluoride (PVF), polychlorofluoroethylene (PCTFE) and tetrafluoroethylene/ethylene copolymer); imide-based resins (for example, aromatic polyimide (PI)); and the like can be mentioned. The thermoplastic resin forming the carcass segmented portion reinforcing layer 9 may also be a mixture of at least two types of these resins.

The thermoplastic elastomer forming the carcass segmented portion reinforcing layer 9 is that in which a thermoplastic resin component and an elastomer component are blended. Preferably, the thermoplastic resin component forms the continuous phase and the elastomer component forms the dispersed phase.

The above mentioned thermoplastic resins can be used as the thermoplastic resin component. That is, a combination of at least one type of both the above mentioned thermoplastic resins and the elastomer component, and the like can be mentioned as the thermoplastic elastomer.

There are no particular limitations on the elastomer component. For example, diene-based rubbers and hydrogenates thereof (for example, NR, IR, epoxylated natural rubber, SBR, BR (high cis-BR and low cis-BR), NBR, hydrogenated NBR, and hydrogenated SBR); olefin-based rubbers (for example, ethylene-propylene rubber (EPDM, EPM), maleic acid-modified ethylene-propylene rubber (M-EPM), IIR, and copolymers of isobutylene and aromatic vinyl or diene-based monomer); acrylic rubber (ACM); halogen-containing rubbers (for example, Br-IIR, CI-IIR, brominated isobutylene p-methylstyrene copolymer (Br-IPMS), CR, hydrin rubber (CHR.CHC), chlorosulfonated polyethylene (CSM), chlorinated polyethylene (CM), and maleic acid-modified chlorinated polyethylene (M-CM)); silicone rubbers (for example, methylvinyl silicone rubber, dimethyl silicone rubber, and methylphenylvinyl silicone rubber); sulfur-containing rubbers (for example, polysulfide rubber); fluororubbers (for example, vinylidene fluoride-based rubber, fluorine-containing vinyl ether-based rubber, tetrafluoroethylene-propylene-based rubber, fluorine-containing silicone rubber, and fluorine-containing phosphazene-based rubber); thermoplastic elastomers (for example, styrene-based elastomers, olefin-based elastomers, and polyamide-based elastomers); and the like can be mentioned. The elastomer component may also be an arbitrary blend of these.

The following polymer compositions can also be preferably used as the thermoplastic resin. These polymer compositions include polyvinyl alcohol (PVOH) and/or ethylene vinyl alcohol copolymer (EVOH), and are a combination of at least one type of polymer other than PVOH and/or EVOH. There are no particular limitations on such polymer. For example, diene-based rubbers and hydrogenates thereof (for example, natural rubber (NR), isoprene rubber (IR), epoxylated natural rubber (E-NR), styrene butadiene rubber (SBR), butadiene rubber (BR), nitrile rubber (NBR), hydrogenated NBR, and hydrogenated SBR); olefin-based rubbers (for example, ethylene-propylene rubber (EPDM, EPM), maleic acid-modified ethylene-propylene rubber (M-EPM), butyl rubber (IIR), and copolymers of isobutylene and aromatic vinyl or diene-based monomer); acrylic rubber (ACM); halogen-containing rubbers (for example, Br-IIR, CI-IIR, brominated isobutylene p-methylstyrene copolymer (Br-IPMS), CR, hydrin rubber (CHR.CHC), chlorosulfonated polyethylene (CSM), chlorinated polyethylene (CM), and maleic acid-modified chlorinated polyethylene (M-CM)); silicone rubbers (for example, methylvinyl silicone rubber, dimethyl silicone rubber, and methylphenylvinyl silicone rubber); sulfur-containing rubbers (for example, polysulfide rubber); fluororubbers (for example, vinylidene fluoride-based rubber, fluorine-containing vinyl ether-based rubber, tetrafluoroethylene-propylene-based rubber, fluorine-containing silicone rubber, and fluorine-containing phosphazene-based rubber); thermoplastic elastomers (for example, styrene-based elastomers, olefin-based elastomers, maleic acid-modified olefin-based elastomers, and polyamide-based elastomers), polyamides (for example, Nylon 6, Nylon 6/66, Nylon 11, Nylon 12, and MXD6); polyesters (for example, PET, PEN, PBT, and PBN); polynitrile-based resins (for example, polyacrylonitrile (PAN) and polymethacrylonitrile); polymethacrylate-based resins (for example, polymethyl methacrylate (PMMA) and polyethyl methacrylate); polyvinyl acetate-based resins (for example, polyvinyl acetate (PVA) and ethylene/vinylacetate copolymer (EVA)); polyvinyl chloride resins (for example, polyvinylidene chloride (PVDC), polyvinyl chloride (PVC), and vinyl chloride/vinylidene chloride copolymer); cellulose-based resins (for example, cellulose acetate, cellulose acetobutyrate, and carboxymethyl cellulose (CMC)); fluorine-based resins (for example, polyvinylidene fluoride (PVDF), polyvinyl fluoride (PVF), and tetrafluoroethylene/ethylene copolymer); imide-based resins (for example, aromatic polyimide (PI)); olefin-based resins (for example, polyethylene (PE), polypropylene (PP), ethylene-ethyl acrylate copolymer (EEA), ethylene-octene copolymer (EO), and maleic acid-modified products thereof); and the like can be mentioned, and these can be used singly or be an arbitrary blend of these.

Preferably, the thermoplastic resin or the thermoplastic elastomer forming the carcass segmented portion reinforcing layer 9 satisfies the following relational expressions.

$$4t+E'-20 \geq 0; \quad (1)$$

$$120t+E'-600 \leq 0; \quad (2)$$

$$E'>0; \quad (3)$$

and $$t>0. \quad (4)$$

E' is a storage elastic modulus (MPa) of the thermoplastic elastic resin or the thermoplastic elastomer forming the carcass segmented portion reinforcing layer, and t is a thickness (mm) of the carcass segmented portion reinforcing layer. The storage elastic modulus E' (MPa) is the value measured by a dynamic viscoelasticity test at a static strain of 10%, a dynamic strain of ±2%, a frequency of 20 Hz, and an atmospheric temperature of 20° C., using a viscoelastic spectrometer made by Toyo Seiki Seisakusho.

When the relational expression (1) is not satisfied, expansion in the tire width direction becomes easier at the time of forming. When the relational expression (2) is not satisfied, riding comfort worsens.

The above mentioned relational expressions can be satisfied by appropriately selecting the type of thermoplastic resin or thermoplastic elastomer forming the carcass segmented portion reinforcing layer and by appropriately selecting the thickness of the carcass segmented portion reinforcing layer. Preferable thermoplastic resins are ethylene vinyl alcohol copolymers. Preferable thermoplastic elastomers are thermoplastic elastomers in which a polyamide based resin and the halogen containing rubber are blended. Thermoplastic elastomers in which Nylon 6 or a Nylon 6/66 copolymer is blended with brominated isobutylene p-methylstyrene copolymer are more preferable. When an ethylene vinyl alcohol copolymer is selected as the thermoplastic resin forming the carcass segmented portion reinforcing layer, the thickness of the carcass segmented portion reinforcing layer is preferably 0.01 to 1 mm. When a thermoplastic elastomer in which Nylon 6 or a Nylon 6/66 copolymer is blended with brominated isobutylene p-methylstyrene copolymer is used as the thermoplastic elastomer forming the carcass segmented portion reinforcing layer, the thickness of the carcass segmented portion reinforcing layer is preferably 0.01 to 3 mm.

When the pneumatic tire is a passenger vehicle pneumatic tire, the storage elastic modulus E' is preferably 50 to 150 MPa, and the thickness t is 0.01 to 0.3 mm. When the storage elastic modulus E' is too small, expansion in the tire width direction becomes easier at the time of forming and when too large, riding comfort worsens. When the thickness t is too small, increase in the tire width direction becomes easier at the time of forming and when too large, the mass increases.

When the pneumatic tire is a heavy duty pneumatic tire, preferably the storage elastic modulus E' is 200 to 500 MPa, and the thickness t is 0.01 to 0.2 mm. When the storage elastic modulus E' is too small, increase in the tire width direction becomes easier at the time of forming and when too large, riding comfort worsens. When the thickness t is too small, expansion in the tire width direction becomes easier at the time of forming and when too large, the mass increases.

Here, as shown in FIG. 1, a lap width A in the width direction in which edges of both the segmented carcass and the carcass segmented portion reinforcing layer 9 overlap is preferably 7% or more of the maximum width BW in the tire width direction of the belt layer. 8% or more and 10% or less is more preferable. This is since, when the lap width A is too small, covering of the segmented portion 53 by the carcass segmented portion reinforcing layer 9 is insufficient, leading to a decrease in generation of force for restraining expansion of the segmented portion 53 in the tire width direction, thus making it difficult to suppress increase in the tire width direction at the time of forming. Also, when the lap width A is too large, weight reduction becomes difficult.

In FIG. 1, although the carcass segmented portion reinforcing layer 9 is laminated on the tread portion 2 so as to cover the segmented portion 53 of the carcass 5 from the outer side in the radial direction of the tire, the present invention is not limited thereto. For example, the carcass segmented portion reinforcing layer 9 may be laminated on the tread portion 2 so as to cover the segmented portion 53 of the carcass 5 from the inner side in the radial direction of the tire. That is, the carcass segmented portion reinforcing layer 9 may be placed between the inner liner 8 and the carcass 5. Also, two carcass segmented portion reinforcing layers 9 may be laminated on the tread portion 2 so as to cover the segmented portion 53 of the carcass 5 from the inner side in the radial direction of the tire and the outer side in the radial direction of the tire. That is, the carcass segmented portion reinforcing layers 9 may be placed so as to sandwich the carcass 5. Also, when the inner liner 8 is formed from a thermoplastic resin or is formed from a thermoplastic elastomer in which a thermoplastic resin component and an elastomer component are blended, the inner liner 8 may double as the carcass segmented portion reinforcing layer 9. When an inner liner formed from a thermoplastic resin or a thermoplastic elastomer is used in a tire segmented by a carcass, it is very advantageous for weight reduction of the tire, and since it is not necessary to provide a carcass segmented portion reinforcing layer separately, forming speed of the tire can be increased.

The pneumatic tire of the present invention can be produced, for example, as follows. The thermoplastic resin or the thermoplastic elastomer forming the carcass segmented portion reinforcing layer is molded into a sheet having a given thickness and then used in the carcass segmented portion reinforcing layer. The thermoplastic elastomer is dynamically cross-linked. Firstly, an inner liner is attached to the top of a tire forming drum, a segmented carcass layer including unvulcanized rubber is attached on top of this, and the segmented portion is covered by a carcass segmented portion reinforcing layer. Next, members normally used in the production of tires such as a belt layer, a tread layer, and the like including unvulcanized rubber are sequentially attached, thus assembling a green tire. A desired pneumatic tire can be produced by thermally vulcanizing this green tire.

When inflating, although there is a problem that the segmented portion only having unvulcanized rubber expands in the tire width direction when a carcass segmented portion reinforcing layer is not provided, since the carcass segmented portion reinforcing layer formed by the thermoplastic resin or the thermoplastic elastomer is more difficult to deform plastically than unvulcanized rubber, expansion in the tire width direction can be suppressed by the segmented portion being covered by the carcass segmented portion reinforcing layer.

EXAMPLES

Using the mixture of Formulation A of Table 1 in Example 1 and the mixture of Formulation B of Table 1 in Examples 2 to 4 as the thermoplastic resin, these were extrusion molded into sheets of various thicknesses using a twin screw extruder equipped with a T-die. Using these sheets as the carcass segmented portion reinforcing layer, pneumatic tires (tire size: 205/55R16) for which the ratio W/BW of the segmented width W in the tire width direction of the segmented portion and the maximum width BW in the tire width direction of the belt layer, and the lap width are different were prepared. The riding comfort, mass, forming speed, and durability were evaluated. In Example 5, a pneumatic tire was prepared by using the sheet obtained by extrusion molding the mixture of Formulation B of Table 1 using a twin-screw extruder equipped with a T-die as an inner liner. That is, in the pneumatic tire of Example 5, the inner liner doubles as the carcass segmented portion reinforcing layer. Also, as Comparative Example 1, a conventional tire formed of a rubber in which the carcass segmented portion reinforcing layer includes steel cords was prepared under the same conditions other than the carcass segmented portion reinforcing layer, then evaluated. The results are shown in Table 2.

The evaluation items and evaluation methods are as follows.

Riding Comfort

Each of the test tires was inflated to an air pressure of 220 kPa and was mounted onto a domestic 2.0 L class passenger vehicle. One person rode in the vehicle and riding comfortability was evaluated with a feeling test by the test driver. The results are indicated by indices where the conventional tire (Comparative Example 1) is 100. The larger this index value, the more superior the riding comfort.

Mass

The mass of each test tire was measured. The results are indicated by indices where the conventional tire (Comparative Example 1) is 100. The smaller this index value, the lighter the tire.

Forming Speed

The necessary time for forming each of the test tires was measured. The results are indicated by indices where the conventional tire (Comparative Example 1) is 100. The higher this index value, the faster the production speed.

Durability

Water pressure was applied to the inside of each test tire and the pressure when the tire burst was measured. The results are indicated by indices where the conventional tire (Comparative Example 1) is 100. The larger this index value, the higher the durability.

TABLE 1

| Blended Components | (parts by mass) | |
|---|---|---|
| | Formulation A | Formulation B |
| Br-IPMS (EXXPRO 89-4, made by ExxonMobil Chemical Company) | 100 | 100 |
| PA 6/66 (UBE Nylon 5033B, made by Ube Industries, Ltd.) | 50 | 30 |
| PA 11(Rilsan BESN 0 TL, made by Atofina Japan, Co. Ltd.) | 20 | 40 |
| Zinc Oxide (Zinc White #3, made by Seido Chemical Industry Ltd.) | 0.2 | 0.2 |
| Stearic acid (beads stearic acid, made by Kao Corporation) | 0.5 | 0.5 |
| Zinc stearate (zinc stearate, made by Seido Chemical Industry Ltd.) | 0.3 | 0.3 |
| Plasticizer (BM-4, made by Daihachi Chemical Industry Co., Ltd.) | 10 | 10 |
| Antioxidant (Irganox 1098, made by Ciba Specialty Chemicals Inc.) | 0.5 | 0.5 |

TABLE 2

| | Comparative Example 1 | Example 1 | Example 2 | Example 3 | Example 4 | Example 5 |
|---|---|---|---|---|---|---|
| Segmented Portion Reinforcing Agent | Steel | Formulation A | Formulation B | Formulation B | Formulation B | Formulation B (as inner liner) |
| E' (MPa) | — | 250 | 100 | 100 | 100 | 100 |
| t (mm) | — | 3 | 0.1 | 0.1 | 0.1 | 0.1 |
| W/BW (segmented width/maximum width of belt layer) | 80% | 70% | 97% | 5% | 70% | 70% |
| Lap Rate (lap width/maximum width of belt layer) | — | 10% | 10% | 10% | 10% | 10% |
| Riding Comfort | 100 | 101 | 105 | 98 | 105 | 105 |
| Mass | 100 | 99 | 93 | 98 | 95 | 97 |
| Forming Speed | 100 | 92 | 100 | 100 | 100 | 110 |
| Durability | 100 | 100 | 90 | 100 | 100 | 100 |

Although riding comfort and forming speed were slightly inferior in Example 1, mass was superior compared to the conventional tire (Comparative Example 1). Although durability was slightly inferior in Example 2, riding comfort and mass were superior compared to the conventional tire (Comparative Example 1). Although riding comfort was slightly inferior, Example 3 was superior in mass compared to the conventional tire (Comparative Example 1). Compared to the conventional tire (Comparative Example 1), Example 4 was superior in riding comfort and mass, while forming speed and durability were not inferior. Compared to the conventional tire (Comparative Example 1), Example 5 had superior riding comfort and mass, while forming speed and durability were not inferior.

INDUSTRIAL APPLICABILITY

The pneumatic tire of the present invention is useful as a lightweight passenger vehicle pneumatic tire and as a heavy duty pneumatic tire.

REFERENCE NUMERALS 1 pneumatic tire
2 tread portion
3 sidewall portion
4 tire bead portion
5 carcass
6 bead core
7 belt layer
8 inner liner
9 carcass segmented portion reinforcing layer
53 segmented portion

What is claimed is:

1. A pneumatic tire comprising:
   a carcass that is formed from at least one layer including a plurality of organic fibrous cords or metallic cords and that has a segmented portion segmented at a tread portion;
   a belt layer;
   a carcass segmented portion reinforcing layer which covers the segmented portion and overlaps the carcass at a region of overlap; and
   an inner liner; wherein
   the carcass segmented portion reinforcing layer is formed from a thermoplastic resin or from a thermoplastic elastomer in which a thermoplastic resin component and an elastomer component are blended,
   the region of overlap where the carcass segmented portion reinforcing layer overlaps the carcass does not extend inwardly in a tire width direction from a tire outer side past an outermost groove portion in the tread portion,
   the inner liner is adjoining the carcass segmented portion reinforcing layer in the tread portion,
   the carcass is adjoining the inner liner in a sidewall portion, and
   the carcass is between the inner liner and the carcass segmented portion reinforcing layer in the region of overlap.

2. The pneumatic tire according to claim 1, wherein
an overlapping lap width of edges of both the segmented carcass and the carcass segmented portion reinforcing layer in a tire width direction is 7% or more of a maximum width BW in the tire width direction of the belt layer.

3. The pneumatic tire according to claim 2, wherein
a segmented width W in the tire width direction of the segmented portion is 10% or more and 95% or less of the maximum width BW in the tire width direction of the belt layer.

4. The pneumatic tire according to claim 3, the inner liner being formed from a thermoplastic resin or from a thermoplastic elastomer in which a thermoplastic resin component and an elastomer component are blended.

5. The pneumatic tire according to claim 4, wherein
the pneumatic tire comprises a passenger vehicle pneumatic tire;
a storage elastic modulus E' of the thermoplastic resin or the thermoplastic elastomer forming the carcass segmented portion reinforcing layer is between 50 and 150 MPa; and
a thickness t of the carcass segmented portion reinforcing layer is between 0.01 and 0.3 mm.

6. The pneumatic tire according to claim 4, wherein
the pneumatic tire comprises a heavy duty pneumatic tire;
the storage elastic modulus E' of the thermoplastic resin or the thermoplastic elastomer forming the carcass segmented portion reinforcing layer is between 200 and 500 MPa; and
the thickness t of the carcass segmented portion reinforcing layer is between 0.01 and 0.2 mm.

7. The pneumatic tire according to claim 1, wherein:
a segmented width W in the tire width direction of the segmented portion is 10% or more and 95% or less of a maximum width BW in the tire width direction of the belt layer.

8. The pneumatic tire according to claim 1, the inner liner being formed from a thermoplastic resin or from a thermoplastic elastomer in which a thermoplastic resin component and an elastomer component are blended.

9. The pneumatic tire according to claim 1, wherein:
the pneumatic tire comprises a passenger vehicle pneumatic tire;
a storage elastic modulus E' (MPa) of the thermoplastic resin or the thermoplastic elastomer forming the carcass segmented portion reinforcing layer is between 50 and 150 MPa; and
a thickness t (mm) of the carcass segmented portion reinforcing layer is between 0.01 and 0.3 mm.

10. The pneumatic tire according to claim 1, wherein:
the pneumatic tire comprises a heavy duty pneumatic tire;
a storage elastic modulus E' (MPa) of the thermoplastic resin or the thermoplastic elastomer forming the carcass segmented portion reinforcing layer is between 200 and 500 MPa; and
a thickness t (mm) of the carcass segmented portion reinforcing layer is between 0.01 and 0.2 mm.

11. The pneumatic tire according to claim 1, wherein:
an overlapping lap width of edges of both the segmented carcass and the carcass segmented portion reinforcing layer in a tire width direction is 8% or more and 10% or less of a maximum width BW in the tire width direction of the belt layer.

12. The pneumatic tire according to claim 1, wherein:
a segmented width W in the tire width direction of the segmented portion is 30% or more and 70% or less of a maximum width BW in the tire width direction of the belt layer.

13. The pneumatic tire according to claim 1, wherein the storage elastic modulus E' (MPa) of the thermoplastic resin or the thermoplastic elastomer forming the carcass segmented portion reinforcing layer and the thickness t (mm) of the carcass segmented portion reinforcing layer further satisfy the relational expressions: $E' \leq 100t$.

14. The pneumatic tire according to claim 1, wherein the segmented portion forms an innermost layer next to an inner liner where the carcass segmented portion reinforcing layer covers the segmented portion.

15. The pneumatic tire according to claim 14, wherein the inner liner is formed from a thermoplastic resin or thermoplastic elastomer.

16. The pneumatic tire according to claim 1, wherein
a storage elastic modulus E' (MPa) of the thermoplastic resin or the thermoplastic elastomer forming the carcass segmented portion reinforcing layer and a thickness t (mm) of the carcass segmented portion reinforcing layer satisfy the relational expressions:

$$4t + E' - 20 \geq 0;$$

$$120t + E' - 600 \leq 0;$$

$$E' > 0; \text{ and}$$

$$t > 0.$$

17. The pneumatic tire according to claim 1, wherein an innermost edge in the tire width direction from the tire outer side in the region of overlap where the carcass segmented portion reinforcing layer covers the carcass is positioned radially inward of the outermost groove portion and is further positioned to coincide in position with the outermost groove portion in the tire width direction.

* * * * *